(12) United States Patent
Price (10) Patent No.: US 6,792,726 B1
(45) Date of Patent: Sep. 21, 2004

(54) PRESEALED SYSTEM

(76) Inventor: Darrell Price, 805 Topaz Dr., Rockledge, FL (US) 32955

(*) Notice: Subject to any disclaimer, the term of this patent is extended or adjusted under 35 U.S.C. 154(b) by 0 days.

(21) Appl. No.: 10/039,695

(22) Filed: Jan. 4, 2002

(51) Int. Cl.$^7$ ................................................ E04C 2/52
(52) U.S. Cl. ........................ 52/220.8; 52/220.1; 52/576; 285/42; 285/58
(58) Field of Search ............................... 52/232, 220.8, 52/577, 576, 699, 220.1, 220.2, 220.3, 220.4, 220.5; 285/42, 56, 58, 192, 215

(56) References Cited

U.S. PATENT DOCUMENTS

| | | | | |
|---|---|---|---|---|
| 1,828,601 A | * | 10/1931 | Frye | 210/165 |
| 3,311,391 A | * | 3/1967 | Harrell | 285/58 |
| 3,834,577 A | * | 9/1974 | Tempero | 312/401 |
| 4,261,598 A | | 4/1981 | Cornwall | 285/56 |
| 4,583,565 A | | 4/1986 | Cornwall | 137/1 |
| 4,623,170 A | | 11/1986 | Cornwall | 285/4 |
| 4,638,829 A | | 1/1987 | Cornwall | 137/75 |
| 4,669,759 A | | 6/1987 | Harbeke | 285/158 |
| 4,724,858 A | | 2/1988 | Cornwall | 137/75 |
| 4,882,886 A | | 11/1989 | Harbeke | 52/232 |
| 5,035,097 A | * | 7/1991 | Cornwall | 52/220.8 |
| 5,072,911 A | | 12/1991 | Logsdon | 249/61 |
| 5,417,019 A | | 5/1995 | Marshall et al. | 52/232 |
| 5,953,872 A | | 9/1999 | MacMillian et al. | 52/220.8 |
| 6,088,972 A | * | 7/2000 | Johanneck | 52/100 |
| 6,101,774 A | * | 8/2000 | Heil | 52/220.8 |
| 6,314,692 B1 | * | 11/2001 | Munzenberger et al. | 52/220.1 |
| 6,336,297 B1 | * | 1/2002 | Cornwall | 52/232 |

* cited by examiner

*Primary Examiner*—Jeanette Chapman
(74) *Attorney, Agent, or Firm*—Brian S. Steinberger; Law Offices of Brian S. Steinberger P.A.

(57) ABSTRACT

Presealed System device for walls, floors and roofs. The Presealed System device forms pre-selected openings in floors and walls and roofs in buildings and/or houses and/or during remodeling projects for allowing plumbing pipes and/or electrical conduits to pass therethrough. The devices include stacked or side by side PVC type sleeves with an inwardly protruding portion of a resilient member such as a t cross-sectional shaped washer separating the sleeves from one another. The resilient member also includes a rearwardly extending portion which extends into the walls and floors that can have ridges thereon, and additional portions which are adjacent to exterior sides of the sleeves. Pipes and conduits placed into the openings through the devices are sealed by the inwardly protruding portions of the resilient members and the seal is maintained during expansion and contraction of the boundary layer that occurs during daytime and nighttime temperature changes and heating and cooling conditions. A fire stop can be additionally added onto one exterior end of the sleeves to help prevent fire from spreading through the pre-formed opening between the boundary. Methods of installing the device prior to pouring the floor and/or forming the wall allow for caps to be placed on exterior open end(s) of at least one of the sleeves, where the cap(s) is removed prior to installing the plumbing pipe and/or electrical conduit through the device.

15 Claims, 12 Drawing Sheets

PRESEALED SYSTEM

This invention relates to couplings, and in particular to methods and apparatus of watertight and fire-protection couplings for pipes, and conduits that pass through floors and walls and roofs that maintains a seal under expansion and contraction of the floors and walls during heating and cooling conditions.

BACKGROUND AND PRIOR ART

During construction, it is important to have the capability of preforming openings in concrete surfaces such as flooring so that pipes and conduits can easily pass through the surface. For example, a poured concrete floor needs to have openings that remain so that plumbing and electrical lines can pass into the floor. Thus, these openings cannot be created after the concrete floor has hardened, and instead must be pre-formed in the concrete floor before the floor has become hardened.

Couplers that pass through floors have been proposed that allow pipes and conduits such as metal pipes and PVC pipes to pass therethrough. ProSet Systems has been known to produce a "Riser Clamp Device", "Concrete Stub", and "Self Seal Stack Assembly" which can be used in floors and walls for allowing metal and PVC pipes to pass through concrete forms, and allege that their devices can be used for firestop applications as a barrier to prevent the spread of fire, gasses and smoke between spaces on opposite sides of the floors and walls. Additionally, the ProSet type couplers are intended to create a seal in any space between the pipe/conduit and the coupler so that air, moisture, and water leakage does not pass through.

However, devices such as ProSet devices are prone to having problems that develop over time since the ProSet coupling generally requires a single longitudinal hollow coupler whose walls are directly in contact with the concrete with a sleeve at one end, and the need for waterproof caulking to be used. For example, during temperature changes such as heating and cooling conditions, the concrete floors tend to expand and contract over time. The rigid single locked in coupler of ProSet can crack and split since the single component does not easily expand and contract. Furthermore, any cracks and splits in this coupler can cause leaks especially around at least the sleeve portion reducing any firestop effects, and also does not keep a proper seal against air, moisture and water leakage. Thus, the single coupler device is especially unsuitable for climates that have alternating warm and cold temperature differentials.

In addition, at least one of the ProSet devices (the Riser Clamp Device) specifically states that "to waterproof . . . fill with caulk . . . ." Thus, these devices can require the added time and expense of needing additional materials and time to form seals such as watertight, airtight, moisture-proof, and the like, when using their couplers.

Many U.S. Patents have been proposed for couplers between floors and walls. See for example, U.S. Pat. No. 4,261,598 to Cornwell; U.S. Pat. No. 4,583,565 to Cornwell; U.S. Pat. No. 4,623,170 to Cornwell; U.S. Pat. No. 4,638,829 to Cornwall; U.S. Pat. No. 4,669,759 to Harbeke; U.S. Pat. No. 4,724,858 to Cornwell; U.S. Pat. No. 4,882,886 to Harbeke; U.S. Pat. No. 5,072,911 to Logsdon; U.S. Pat. No. 5,417,019 to Marshall et al.; U.S. Pat. No. 5,953,872 to MacMillian et al.; and U.S. Pat. No. 6,088,972 to Johanneck. While some of these patents appear to cover couplers, none of these proposed patented devices completely take into account the natural expansion and contraction of flooring materials, such as concrete that is normally placed about the couplers which can damage the effects of the couplers. These proposed devices are also subject to being prone to cracking and splitting over time, which potentially can cause air, moisture and water leakages as well as reduced effects of using the couplers as firestops, between floors and walls.

SUMMARY OF THE INVENTION

A primary objective of the invention is to provide a pipe/conduit coupler for floors and walls that can expand and contract overtime without damage.

A secondary objective of the invention is to provide a pipe/conduit coupler for floors and walls and roofs that is not damaged (i.e. cracking, splitting, and the like) by alternating cold and warm temperature differentials.

A third objective of the invention is to provide a pipe/conduit coupler for floors and walls and roofs that is useful as a firestop preventer to stop fire from passing through the coupler opening.

A fourth objective of the invention is to provide a pipe/conduit coupler for floors and walls and roofs that maintains air, moisture and water seals over time.

A fifth objective of the invention is to provide a pipe/conduit coupler that can be easily installed in desirable selected locations prior to forming walls and pouring floors and for roof penetrations.

A sixth objective of the invention is to provide a pipe/conduit coupler for floors and walls and roofs that can prevent fire, smoke, air, water, and moisture from penetrating through the openings about pipes and conduits.

A seventh objective of the invention is to provide a pipe/conduit coupler for floors and walls and roofs that can prevent insects and gases from penetrating through the openings about pipes and conduits.

An eighth objective of the invention is to provide a pipe/conduit coupler for existing floors, walls and roofs that can prevent insects, gases, fire, smoke, water and moisture from penetrating through the openings about pipes and conduits.

The Presealed System invention can be installed for floors where the device has a bottom sleeve placed on a plywood base, with resilient member on top of the bottom sleeve, and an upper sleeve stacked on the resilient member. Firestops can be positioned in either or both the upper or lower sleeves. A cap can cover the upper exposed end of the upper sleeve. A floor such as a concrete floor can later be poured about the device. Later the cap can be removed and piping/conduits can be placed through the sleeves and resilient member for passing plumbing and electrical lines therethrough.

The invention can have similar applications to be used with penetrations in walls and on roofs as well.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
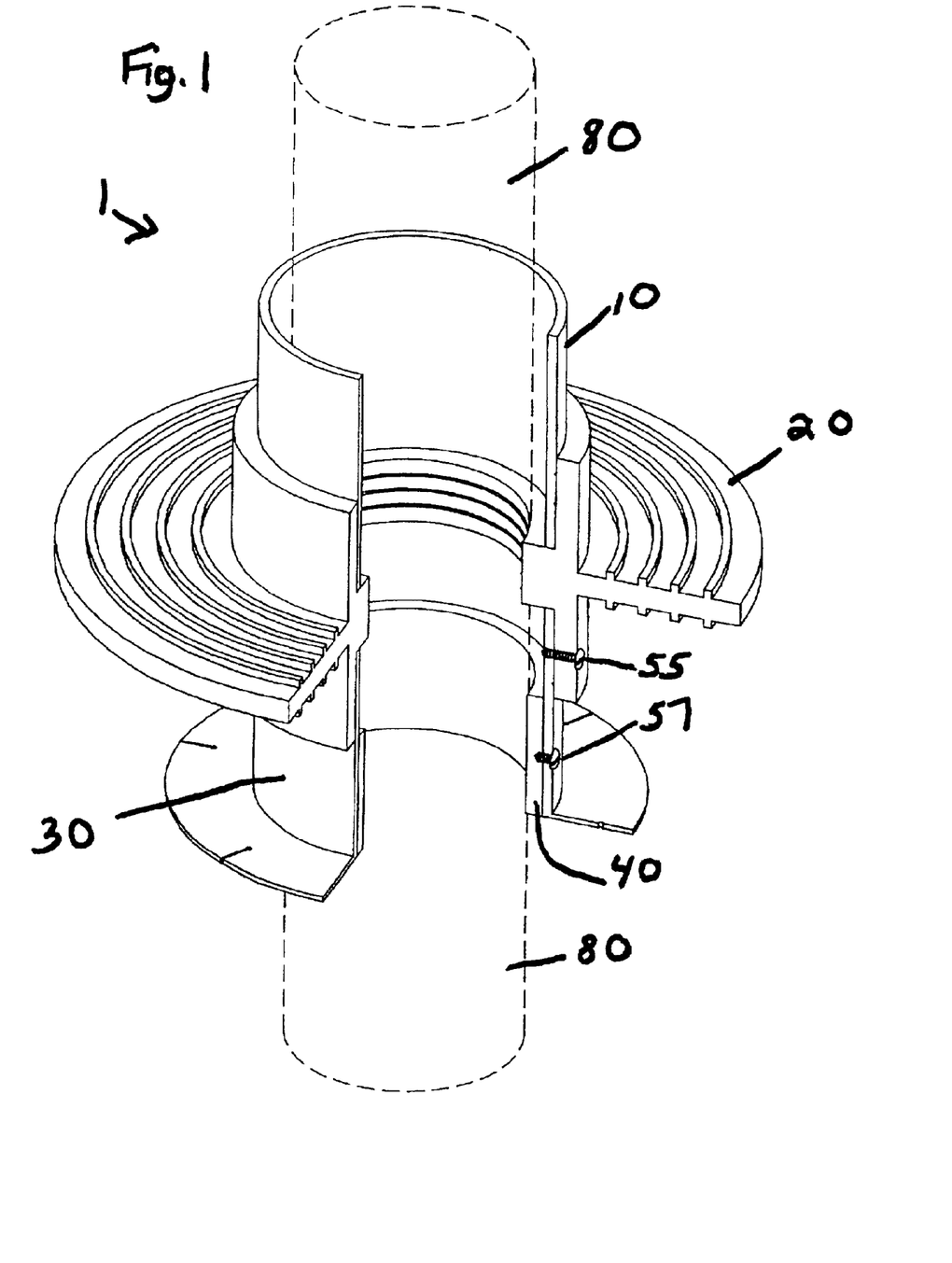
FIG. 1 is a perspective view of a preferred embodiment of the Presealed System invention for floor installation.
Figure 2:
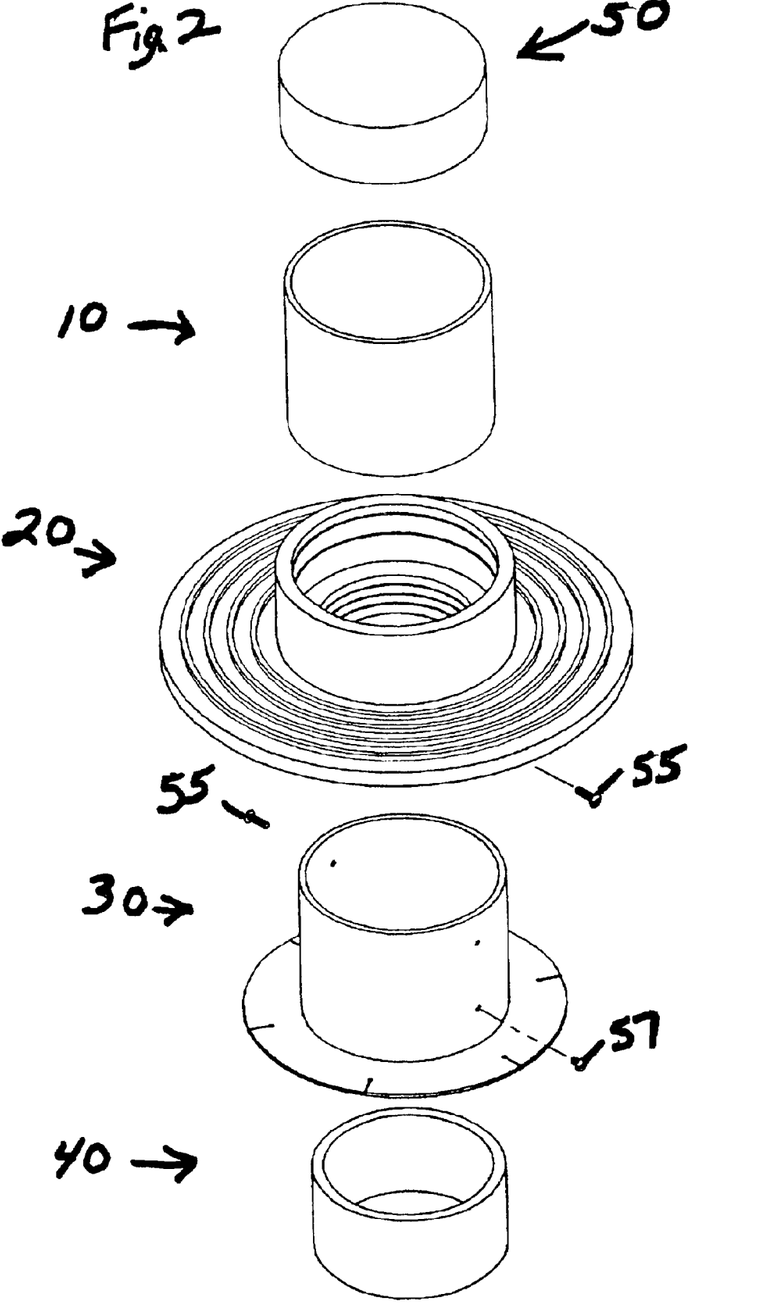
FIG. 2 is an exploded view of the embodiment of FIG. 1 with a removable cap member.

FIG. 1 is a perspective view of a preferred embodiment of the Presealed System invention 1 for floor installation. FIG. 2 is an exploded view of the embodiment 1 of FIG. 1 with a removable cap member 50. Referring to FIGS. 1–2, Presealed System invention can include an upper sleeve 10 such as a PVC sleeve and the like, a resilient sleeve member 20 such as a rubber sleeve, neoprene or fire retardant material, and the like, and combinations thereof, can be placed beneath the upper sleeve, and a lower sleeve 30 such as a PVC sleeve with nail plate base, beneath the resilient member 20. The resilient sleeve 20 is stacked on the lower sleeve 30 and the upper sleeve 10 is stacked on the resilient sleeve, and a fire stop interior sleeve 40 such as a fire resistant material is positioned into a lower exposed open end of the lower sleeve 30. A cap cover 50 can be placed over the exposed top end of the upper sleeve 10 prior to forming a floor and is removed prior to installing a pipe 80 such as a plumbing pipe and/or electrical conduit therethrough. Fasteners 53, 57 such as screws and the like can pre-attach the fire stop sleeve internal to the lower sleeve 30, and attach the resilient member 20 to the lower sleeve 30. The installation will be further described in reference to FIGS. 6A–7B.

Figure 3A:
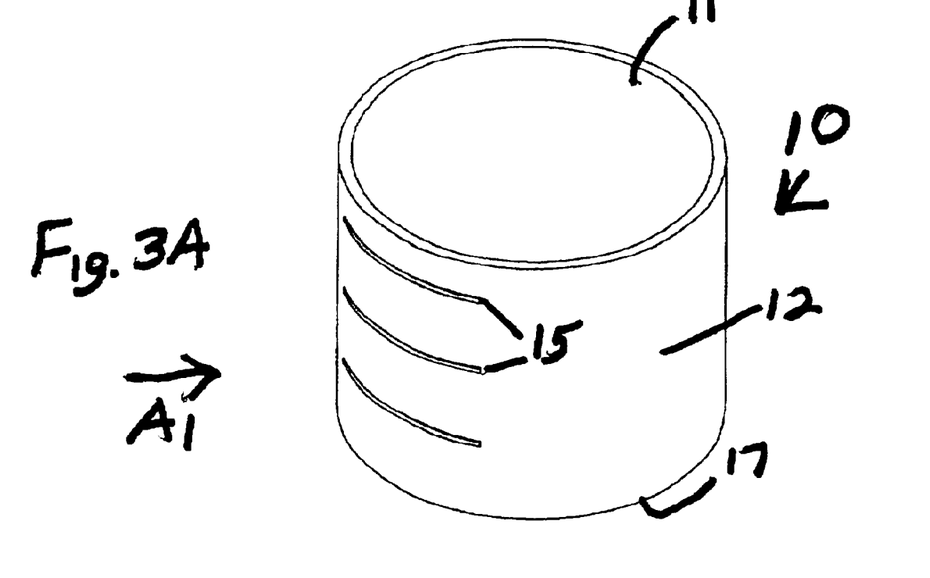
FIG. 3A is a perspective view of an upper sleeve used in FIGS. 1–2.
Figure 3B:
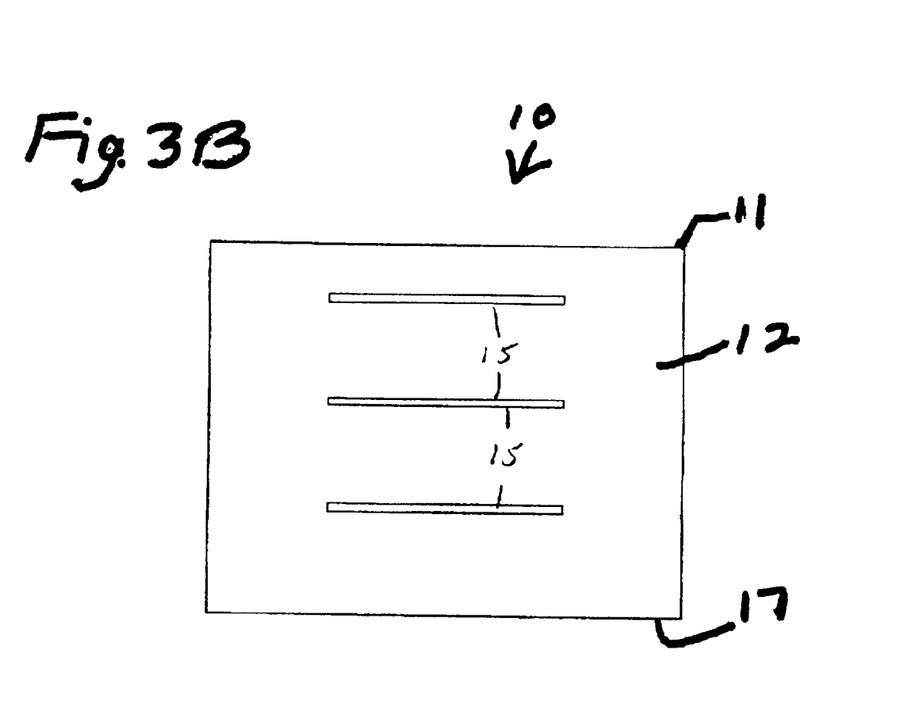
FIG. 3B is a side view of the upper sleeve of FIG. 3A along arrow A1.

FIG. 3A is a perspective view of an upper sleeve 10 used in FIGS. 1–2. FIG. 3B is a side view of the upper sleeve 10 of FIG. 3A along arrow A1. Referring to FIGS. 3A–3B, upper sleeve 10 can be a hollow PVC coupler having an upper open end 11 and bottom open end 17. Along the sides 12 of the upper sleeve 10 can be up to three or more parallel surface exterior facing notched markings 15 that are spaced apart from one another. For example, the notched markings 15 can be spaced approximately one inch apart from one another. These notch markings are for different thicknesses of floor, walls, etc., and can be cut at whatever notch for the right thickness if need be.

Figure 4A:
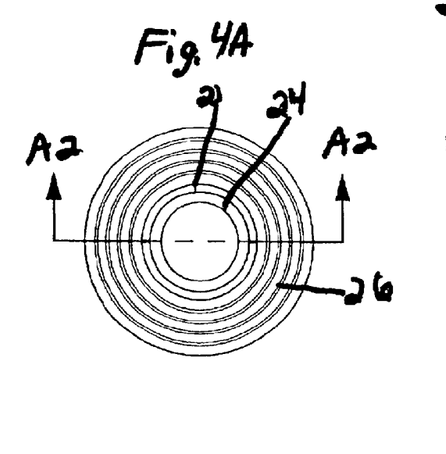
FIG. 4A is a top view of the resilient member used in FIGS. 1–2.
Figure 4B:
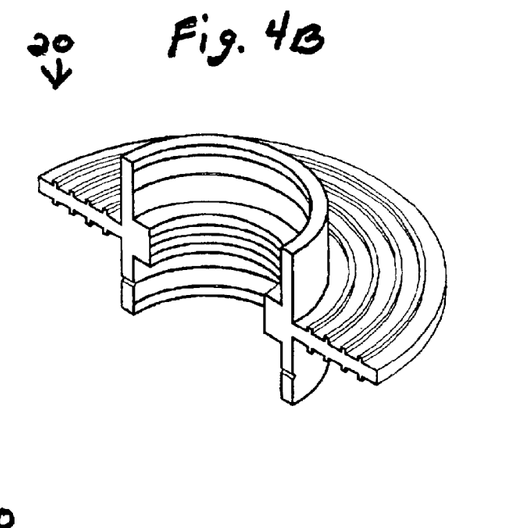
FIG. 4B is a perspective cross-sectional view of the resilient member of FIG. 4A along arrow A2.
Figure 4C:
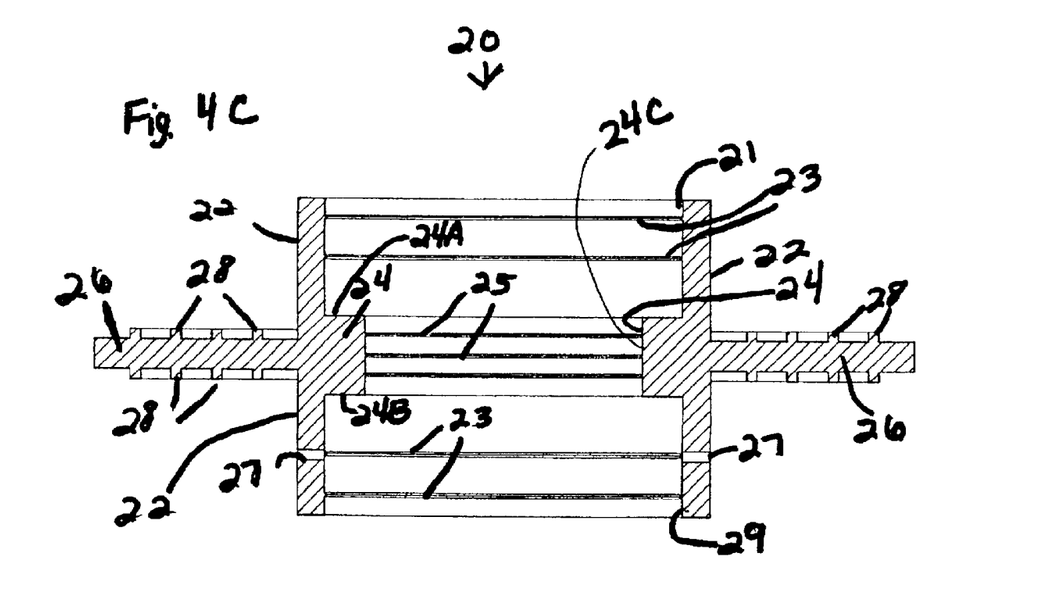
FIG. 4C is side view of the resilient member of FIG. 4A along arrow A2.

FIG. 4A is a top view of the resilient member 20 used in FIGS. 1–2. FIG. 4B is a perspective cross-sectional view of the resilient member 20 of FIG. 4A along arrow A2. FIG. 4C is side view of the resilient member 20 of FIG. 4A along arrow A2. Referring to FIGS. 4A–4C, hollow resilient member 20 can be formed from rubber, and the like, and include an upper open end 21 and a bottom open end 29. Along upper and lower interior side walls of resilient sleeve 20 can be raised ridges and grooves 23 for allowing a seal to exist when the upper and lower sleeves 10, 30 are positioned inside the resilient sleeve 20. Protruding inwardly from a mid interior wall portion of sleeve 20 can be a raised wall 24 having an upper ledge 24A for allowing the bottom end of the upper sleeve 10 to sit thereon, and a lower ledge 24B for allowing the upper end of the lower sleeve 30 to abut against. On the interior facing side of wall portion 24 can be raised grooves 25 for forming a seal with a piping/conduit (80 FIG. 1) is positioned therein. Extending away from sides 12 of resilient sleeve 20 can be a ring type washer 26 having upper and lower raised ridges and grooves 28 which enable a tight sealed connection when a concrete floor is poured about the device 1. Together the inwardly protruding wall 24 upper and lower extending sides 22(which are substantially perpendicular to the wall 24) and an outwardly extending ring 26 form a substantially t cross-sectional shape. Through-holes 27 such as pre-drilled holes, though the lower side walls 22 of the resilient sleeve allow for the fasteners 55(FIG. 1) to attach the resilient member 20 to the lower sleeve 30.

Figures 5A, 5B, 5C:
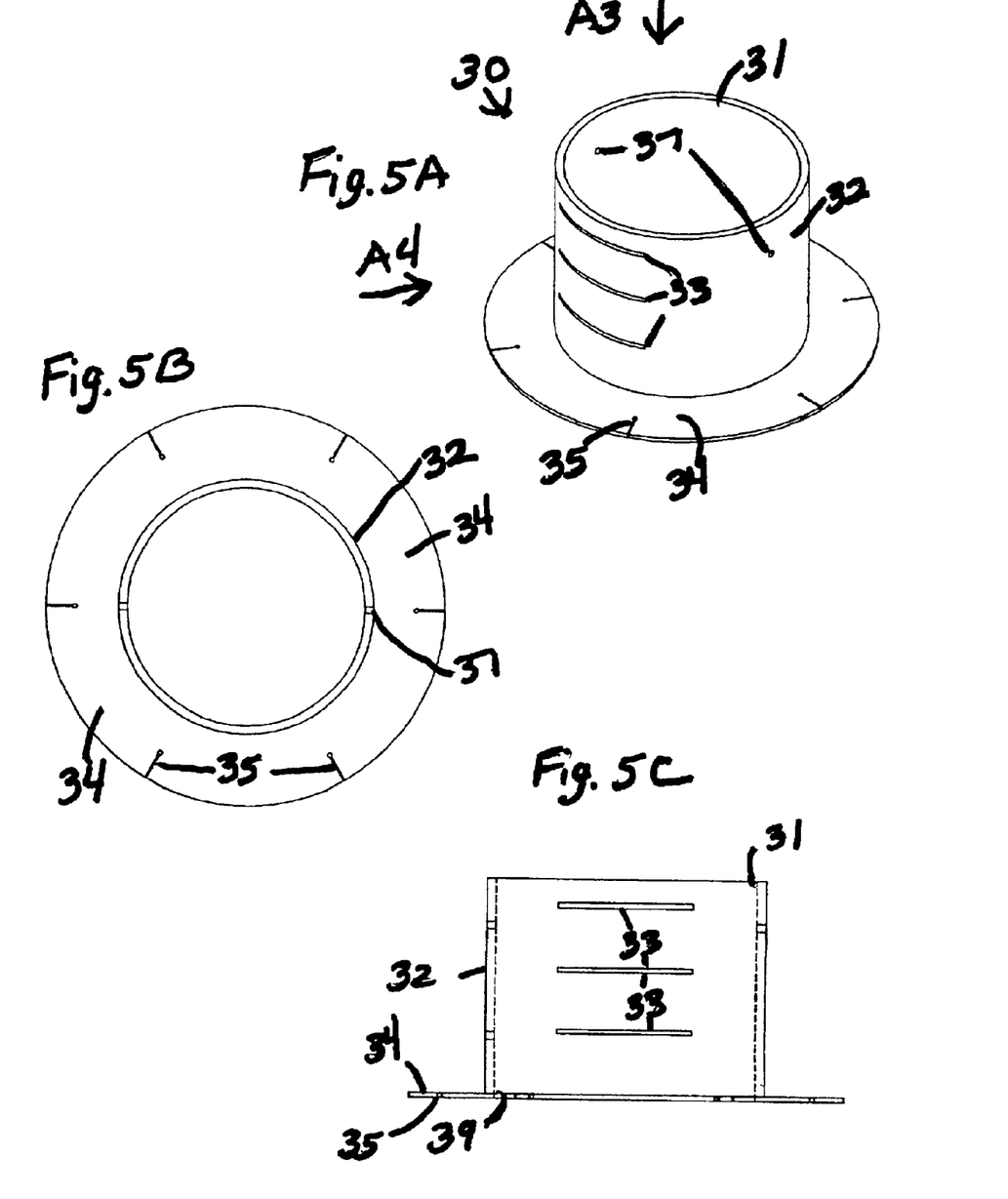
FIG. 5A is a perspective view of the lower nail plate sleeve used in FIGS. 1–2.
FIG. 5B is a top view of the lower sleeve of FIG. 5A along arrow A3.
FIG. 5C is a side view of the lower sleeve of FIG. 5A along arrow A4.

FIG. 5A is a perspective view of the lower nail plate sleeve 30 used in FIGS. 1–2. FIG. 5B is a top view of the lower sleeve 30 of FIG. 5A along arrow A3. FIG. 5C is a side view of the lower sleeve 30 of FIG. 5A along arrow A4. Referring to FIGS. 5A–5C, hollow lower sleeve 30 can be a hollow PVC coupler having an upper open end 31 and bottom open end 39. Along the sides 32 of the lower sleeve 30 can be up to three or more parallel surface exterior facing notched markings 33 that are spaced apart from one another. For example, the notched markings 33 can be spaced approximately one inch apart from one another, these are used to mark different floor, wall, etc., thicknesses, if need to be cut for thickness and form a seal when the lower sleeve 30 is placed into the bottom opening 29 of the resilient member 20 and the raised ridges 23 seal against the sides 32 of the lower sleeve 30. Extending outwardly about the bottom end opening 39 of lower sleeve 30 can be a nail plate ring plate 34 having slits 35 at the plate edges so that fasteners such as nails can be used to secure the Presealed System device onto a plywood board(as shown later in FIGS. 6A–7B). Side through-holes 37 in the sidewalls 32 of lower sleeve 30 allow fasteners 57 to attach an inner located sleeve fire stop 40 to the lower sleeve 30.

Figure 6A:
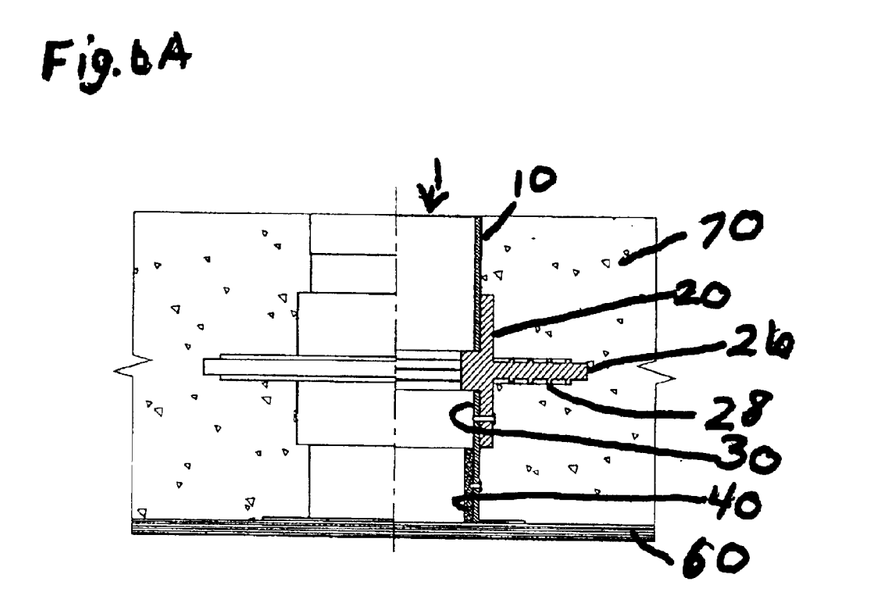
FIG. 6A is a side cross-sectional view of an installed sealed tight device of FIGS. 1–5C on a plywood floor base, after a concrete layer was formed about the device and the cap was removed.
Figure 6B:
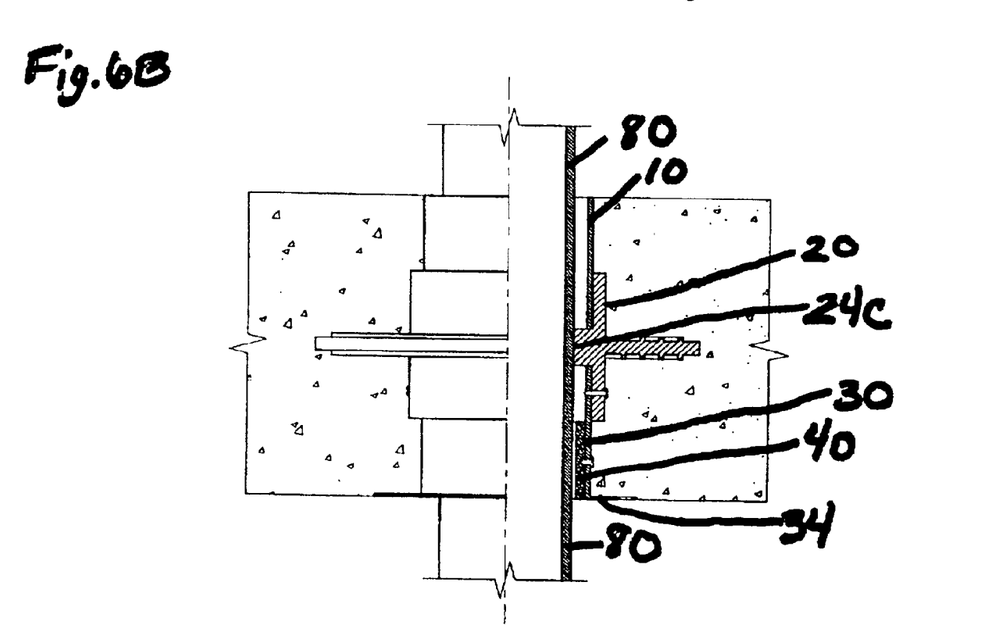
FIG. 6B is another view of the installation configuration of FIG. 6A with a pipe/conduit inserted and sealed through the device.

FIG. 6A is a side cross-sectional view of an installed sealed tight device 1 of FIGS. 1–5C on a plywood floor base 60, after a concrete layer 70 was formed about the device 1 and the cap 50(FIG. 2) was removed. FIG. 6B is another view of the installation configuration of FIG. 6A with a pipe/conduit 80 inserted and sealed through the device 1.

Referring to FIGS. 1–6A, the Presealed System device is first stacked together with the resilient member 20 placed over and about the lower sleeve so the ledge 24B of the interior facing wall 24 abuts against the upper open end 31 of the lower sleeve 30 and the lower sleeve 30 is fastened by fasteners 55 to the resilient member 20. Additionally, the lower sleeve 30 is sealed to the resilient member 20 by the raised ridges 23 in the resilient member 20. A fire stop sleeve 40 can be placed inside the bottom open end 39 of the lower sleeve 30 and fastened thereto with fasteners 57. Next, the bottom end 17 of the upper sleeve 10 is placed into the upper open end 21 of the resilient member 20 and abuts against upper ledge 24A of the inwardly protruding wall 24 and is sealed together by the raised ridges 23 of the resilient member 20 and sides 12 of the upper sleeve 10. A cap cover 50(FIG. 2) can be placed over the upper open end 11 of the upper sleeve 10. Next, the ring plate 34 of the lower sleeve 30 can be fastened to a selected location on top of the plywood floor base 60. And finally, the floor 70 such as concrete, and the like, can be poured about the device I, and the raised ridges and grooves 28 of outwardly extending ring 26 of the resilient member forms an enhanced seal to the concrete 70. The protective cap cover 50 can prevent concrete from being poured into the device 1.

Referring to FIG. 6C, after the concrete is hardened, both cap cover 50 and plywood floor base 60 can be removed, and a pipe 80 such as a plumbing pipe and/or electrical conduit can be inserted through the device and be sealed to the device 1 by the interior facing edge 24C of interior protruding wall 24 of the resilient member 24. The cap cover 50 can be removed by pulling it off or by cutting it directly on the inside of upper sleeve 10. The plywood floor base 60 can be pried off and the nails holding the base 60 to the nail plate ring 34 of the lower sleeve 30 will slip through the slits 35 of the lower sleeve 30.

When being inserted the ends of the pipe 80 can be beveled for easing the pipe 80 into the device 1. Additionally, the ends of the pipe 80 can be soaped to allow for a lubricated fit into the device 1. In operation, the inwardly protruding wall 24 of the resilient member 20 and the exterior facing ring 26 allow for some expansion and contraction of the surrounding concrete floor 70 with daytime and nighttime temperature changes and alternating hot and cold conditions that can normally take place in most Northern United States climates. The novel invention allows for expansion and contraction so that the pipe 80 would be able to move within the device 1. The device 1 substantially maintains a water tight, air tight and moisture proof seal with the pipe 80 passing therethrough.

Figure 7A:
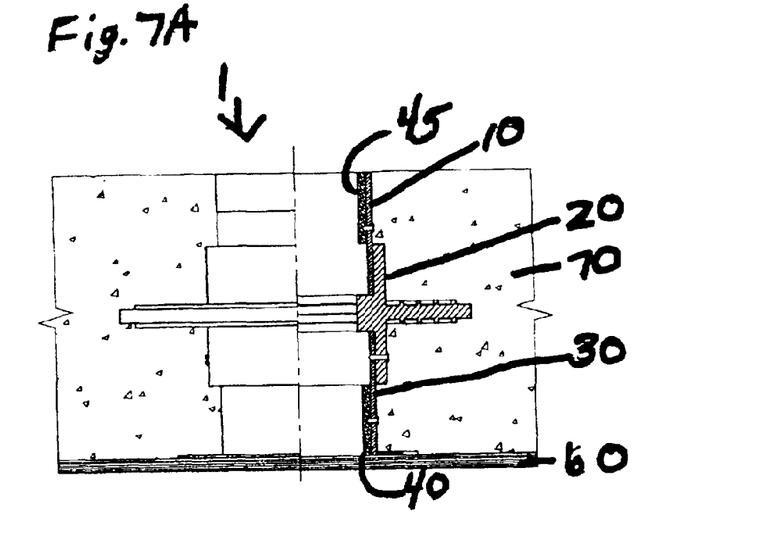
FIG. 7A is a side cross-sectional view of another installed sealed tight device of FIGS. 1–5C on a plywood floor base with two firestops, after a concrete layer was formed about the device and the cap was removed.
Figure 7B:
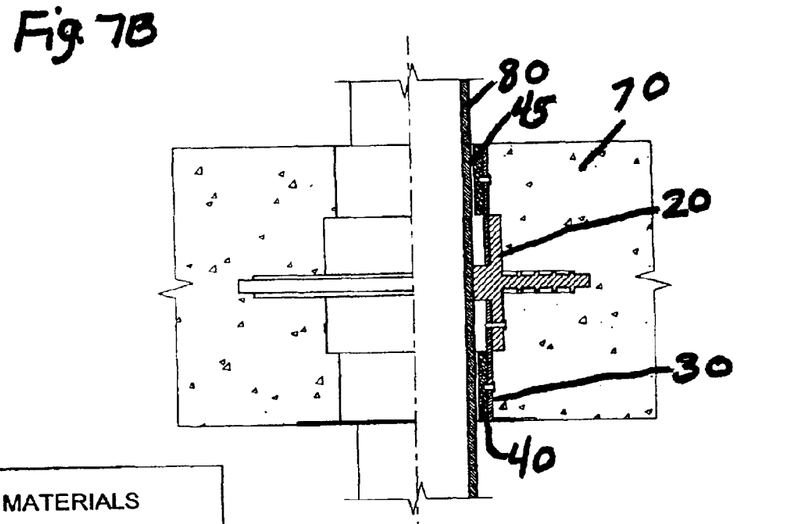
FIG. 7B is another view of the installation configuration of FIG. 7A with a pipe/conduit inserted and sealed through the device.

FIG. 7A is a side cross-sectional view of another installed sealed tight device 1' of FIGS. 1–5C on a plywood floor base 60 with two firestops 40 and 45, after a concrete layer 70 was formed about the device 1 and the cap 50(FIG. 2) was removed. FIG. 7B is another view of the installation configuration of FIG. 7A with a pipe/conduit inserted 80 and sealed through the device 1. The installation of the device 1' is identical to that of FIGS. 6A–6B with the exception that two fire stops 40 and 45 are used on both the upper sleeve 10 and the lower sleeve 30 so that an enhanced fire prevention would occur so that fire starting on either side of the floor 70 would not easily pass through the device 1'.

Figure 8A:
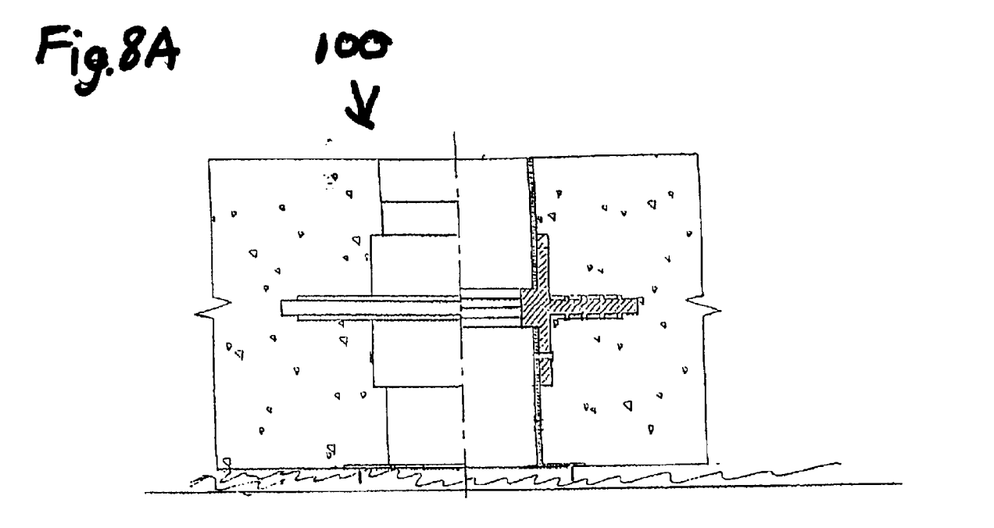
FIGS. 8A and 8B are side cross-sectional views of another embodiment of the installed device of the preceding figures having been installed with no fire stops.
Figure 8B:
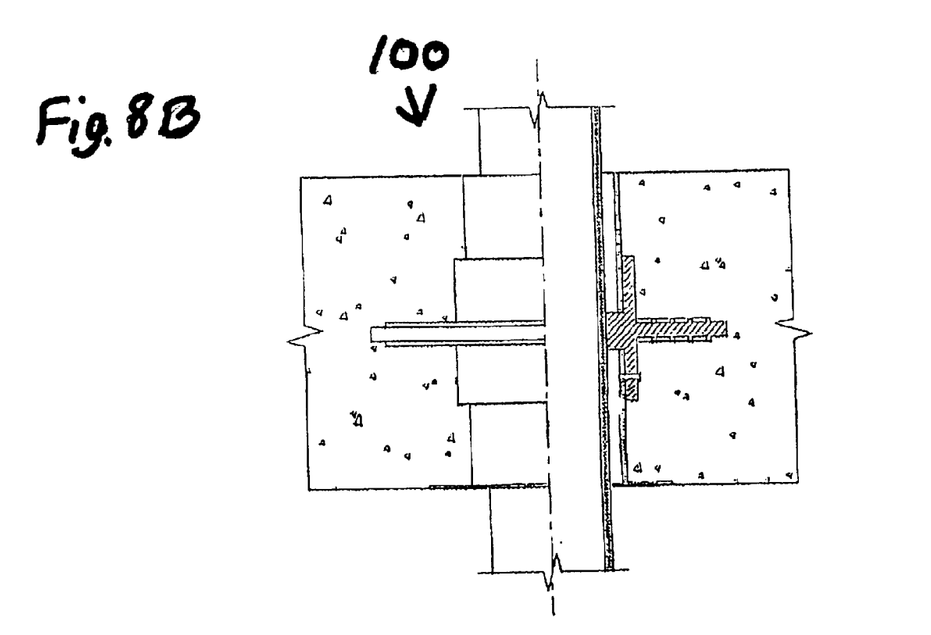

FIG. 8A–8B shows side cross-sectional views of the installed device of the preceding figures having been installed with no fire stops for floor applications. The installation of the embodiment 100 of FIGS. 8A–8B is similar to the preceding figures except that no fire stops 40, 45 are being used.

Figure 9:
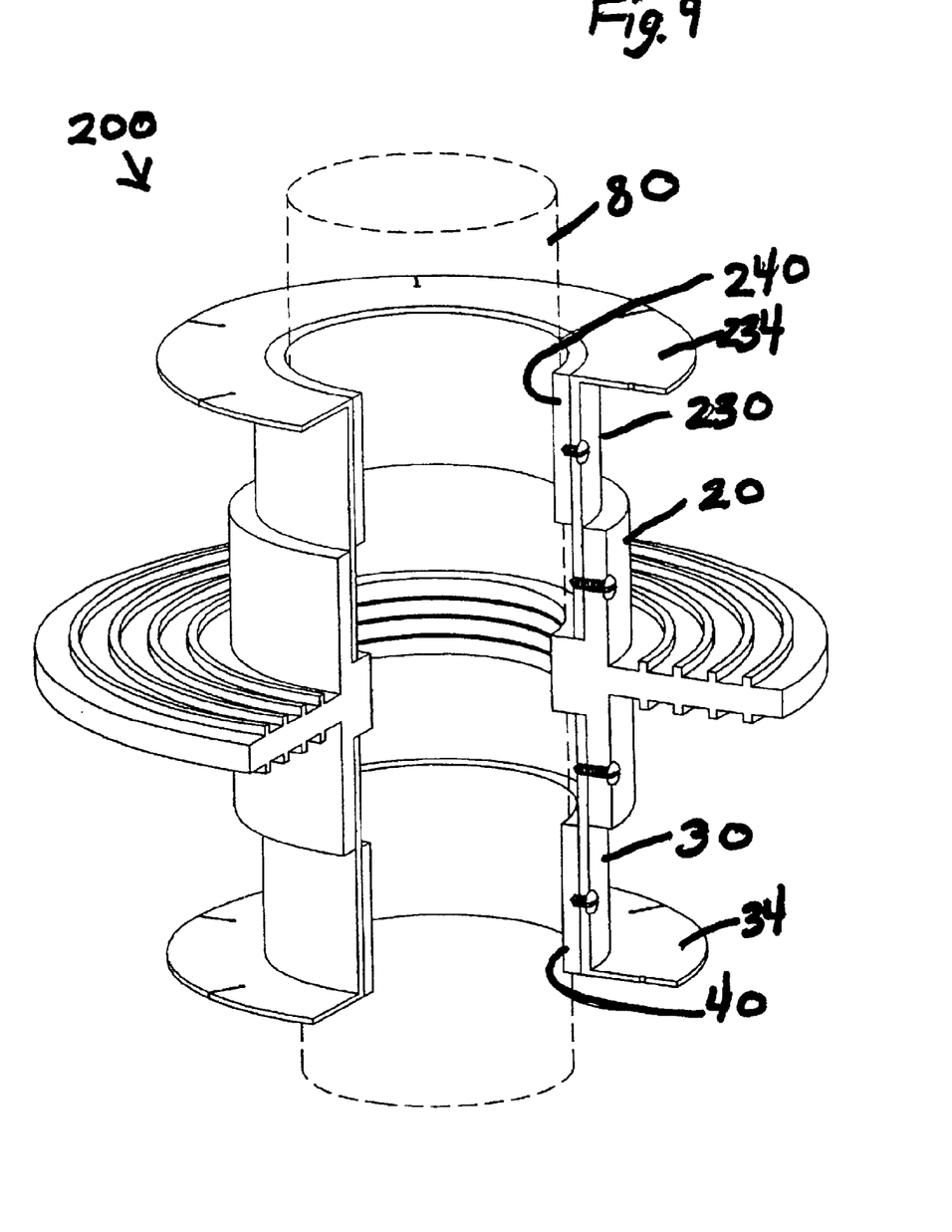
FIG. 9 shows a perspective view of another embodiment of the novel invention for wall applications with fire stops.
Figure 10:
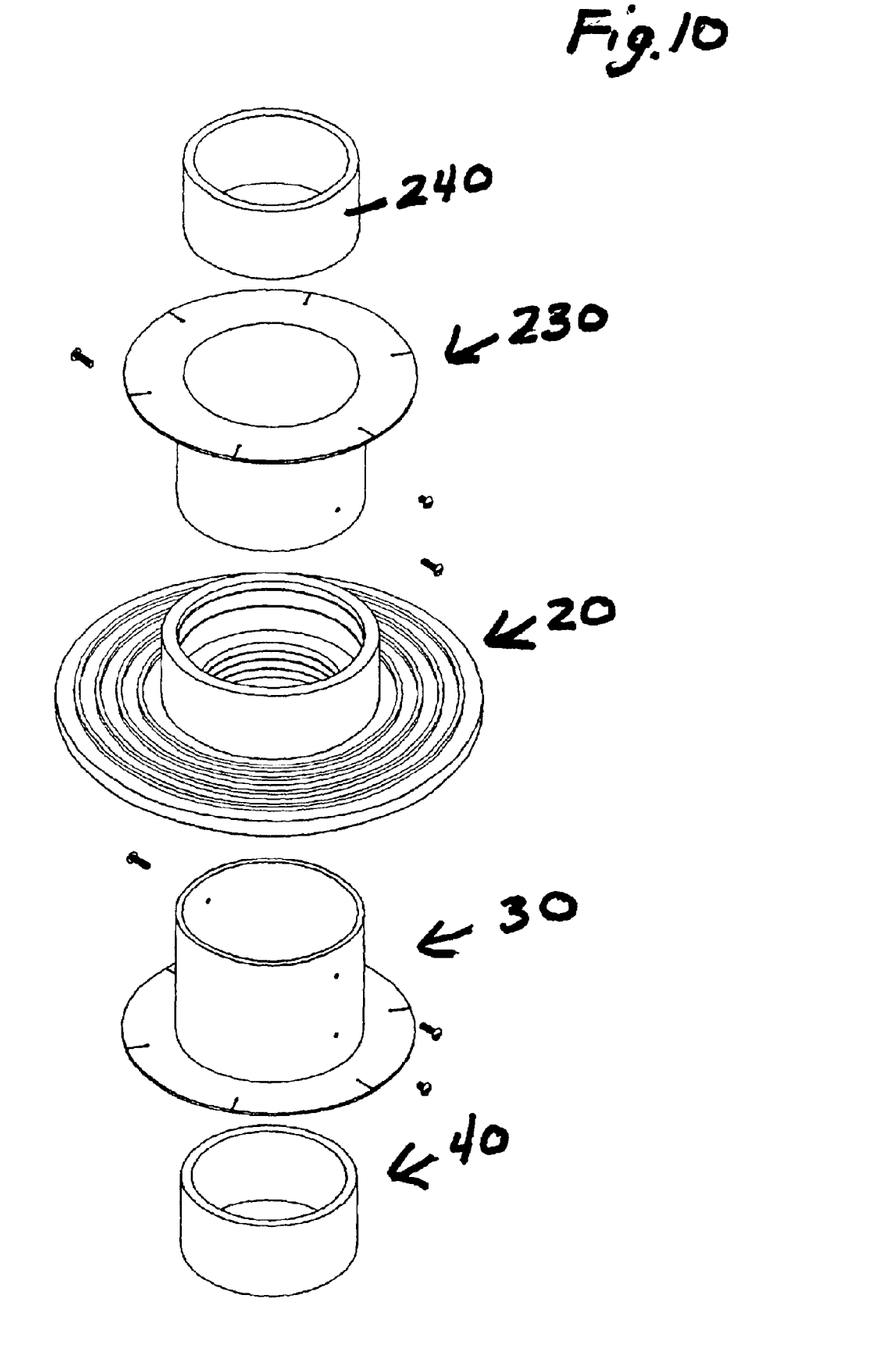
FIG. 10 is an exploded view of the wall application embodiment of FIG. 9.
Figure 11:
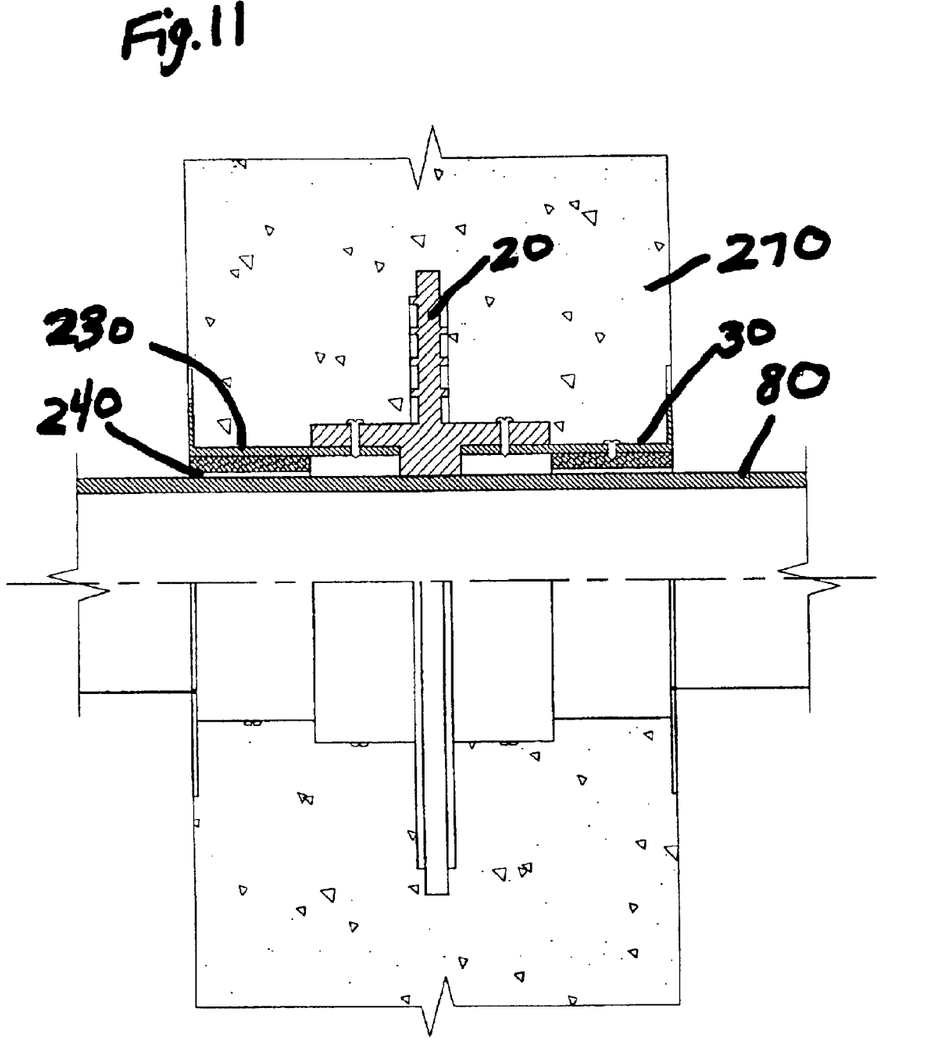
FIG. 11 is a side cross-sectional view of the installed wall embodiment of FIGS. 9–10.

FIG. 9 shows a perspective view of another embodiment 200 of the novel invention for wall applications with fire stops 40, 240. FIG. 10 is an exploded view of the wall application embodiment 200 of FIG. 9. FIG. 11 is a side cross-sectional view of the installed wall embodiment 200 of FIGS. 9–10. Referring to FIGS. 9–11, embodiment 200 is similar to device 1 with the exception of having an upper sleeve 230 that is identical to the lower sleeve 30 previously described, and a second fire stop 240. The assembly of embodiment 200 is similar to those previously described with the exception that embodiment 200 is mounted for wall penetrations. For wall applications, the device 200 is placed in desired locations for where penetrations through a wall will be selected. The device 200 can have its ring shaped plates 34, 234 of the sleeves 30, 230 be initially fastened such as be nailed to framing members such as studs, and the like, in the walls that are being constructed. The fire stops 40, 240 can be attached similar to the embodiments previously described. For wall applications, an installer such as a mason can easily mud concrete 270 about the device 1 to make sure there is mud all the way around the device 1.

Figure 12:
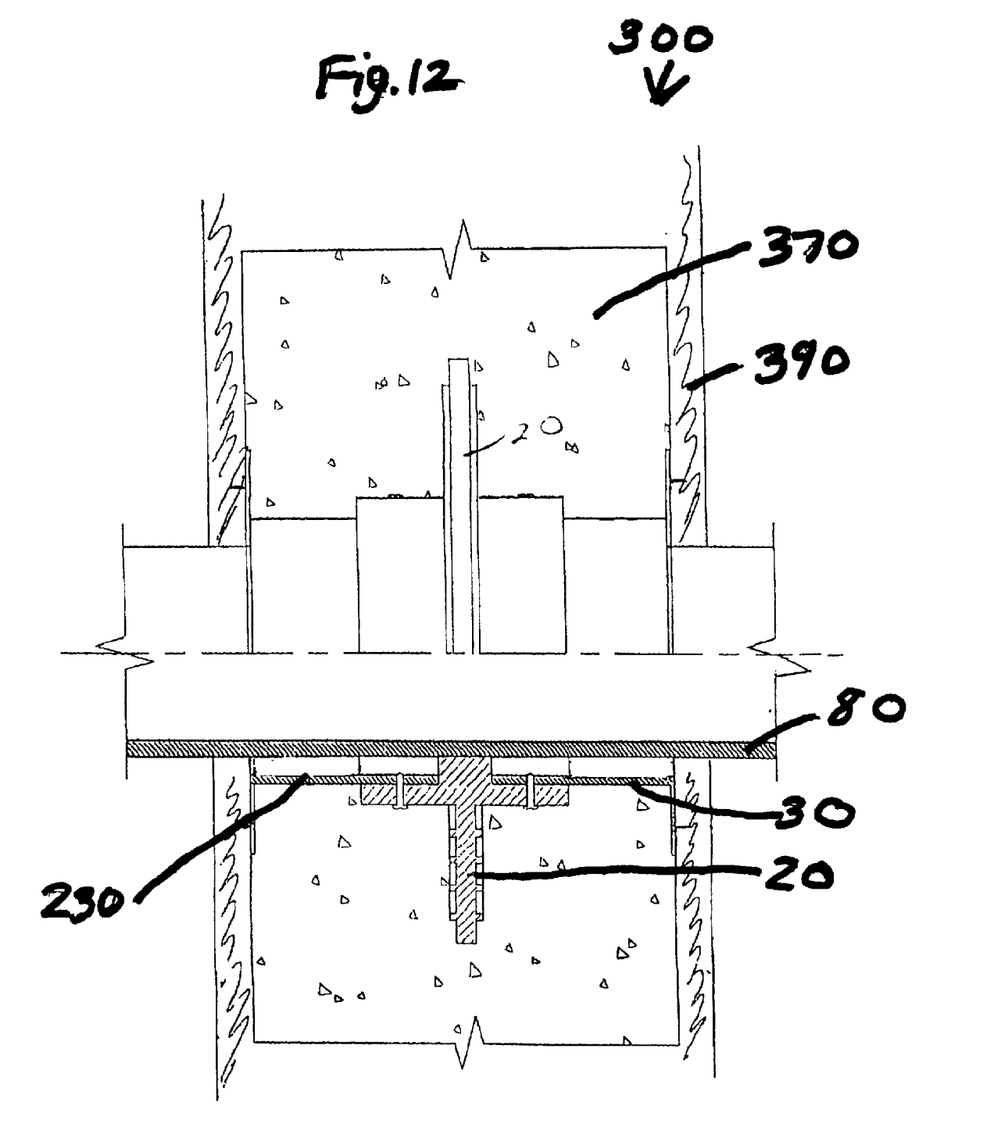
FIG. 12 shows a side cross-sectional view of the installed device of the preceding figures for a wall application without any fire stops.

FIG. 12 shows a side cross-sectional view of the installed device 300 of the preceding figures for a wall application without any fire stops. Additionally, outer wall layers 390 such as sheet rock, dry :wall, and the like, can be used about the walls 370.

The novel device and system described can save time and labor on job sites due to its completeness and easy installation. The novel invention can keep out fire, smoke, air, water, and moisture from penetrating through the openings about pipes and conduits. The novel invention can also seal against insects and gases.

The invention can be used in all types of applications such as for use with installing valve boxes, lift stations, floor drains, roof drains, electrical boxes, swimming pool drains and openings, urinals,: roof openings, roof vents, floor and wall penetrations, and any penetrations for electrical, mechanical and plumbing piping applications. Also, this system would be of great benefit in seismic locations because of its ability to expand and contract and to allow pipe movement.

Although the preferred embodiments are described with being used before a floor or wall is formed, the invention can be used with existing floors, walls and roofs. For example, the outer ring 26 of the resilient sleeve 20 can be cut to fit an existing hole opening. The nail plate 34 of the lower sleeve 30 can be taken out of the sleeve 20 and the remainder of the lower sleeve 20, the sidewalls 32 with the resilient sleeve 20 can be installed into the existing opening. Put a bead of watertight caulk between nail plate 34 and floor or wall face and secure to floor or wall face with appropriate hardware. Any voids about the device 1 can be sealed with fire resistant caulk, and the like. For pre-existing openings, portions of the device can be separately installed and assembled as the voids about the device are being filled.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A seal tight device, comprising:

a first rigid sleeve;

a second rigid sleeve; and a resilient member having a first portion which separates an end of the first sleeve from an end of the second sleeve, and having a second portion substantially perpendicular to the first portion which is exterior to the first sleeve and the second sleeve, and having a third portion extending outward from the second portion, the third portion having at least one raised ridge on a surface portion of the third portion, wherein the first sleeve, the second sleeve and the resilient member pass through a boundary that separates two spaces from one another, the resilient member being located inside the boundary.

2. The seal tight device of claim 1, wherein the first sleeve and the second sleeve are each PVC sleeves.

3. The seal tight device of claim 1, wherein the resilient member includes: a rubber sleeve.

4. The seal tight device of claim 1, wherein the third portion includes:

a washer configuration.

5. The seal tight device of claim 1, wherein the first portion, the second portion and the third portion includes: a substantially t cross-sectional shape.

6. The seal tight device of claim 1, wherein the boundary is a wall.

7. The seal tight device of claim 1, wherein the boundary is a floor.

8. The seal tight device of claim 1, wherein the boundary includes: concrete.

9. The seal tight device of claim 1, further comprising:

a fire stop adjacent to the second sleeve.

10. The seal tight device of claim 1, further comprising:

a plumbing pipe inserted through the first sleeve, the resilient member and the second sleeve, wherein the resilient member forms a seal about the pipe which is substantially maintained during expansion and contraction of the seal tight device during heating and cooling conditions.

11. The seal tight device of claim 1, further comprising:

a conduit inserted through the first sleeve, the resilient member and the second sleeve, the pipe allowing electrical lines to pass therethrough, wherein the resilient member forms a seal about the conduit which is substantially maintained during expansion and contraction of the seal tight device during heating and cooling conditions.

12. A seal tight device system for walls and floors, comprising in combination:

a first rigid sleeve extending through one side of a boundary, the boundary being selected from at least one of a wall, and a floor;

a second rigid sleeve extending through a second side of the boundary opposite the first side;

a resilient member located in-side the boundary having a first portion which separates and end of the first sleeve from and end of the second sleeve, the resilient member having an inwardly protruding portion being the first portion, a second portion substantially adjacent to the first portion and positioned exterior to the first sleeve and the second sleeve, and a third portion extending away from and being substantially perpendicular to the second portion, the first and the second and the third portions forming a substantially t cross-sectional shape, the first sleeve, the second sleeve and the resilient member form a through-hole opening through and inside of the boundary; and a pipe passing through the through-hole in the boundary, the pipe being selected from at least one of a plumbing pipe and an electrical conduit.

13. The seal tight device system of claim 12, further comprising:

a fire stop adjacent to the second sleeve.

14. A seal tight device, comprising:

a first sleeve;

a second sleeve; and a resilient member having a first portion which separates the first sleeve from the second sleeve; and a fire stop adjacent to the second sleeve, wherein the first sleeve, the second sleeve and the resilient member pass through a boundary that separates two spaces from one another, the resilient member being located inside the boundary.

15. A seal tight device, comprising in combination:

a first plastic cylindrical sleeve;

a second plastic cylindrical sleeve; and a resilient member having a first portion protruding inside the first sleeve and the second sleeve that separates the first sleeve from the second sleeve, a second portion perpendicular to the first portion that is adjacent to side portions of the first sleeve and the second sleeve, and a third portion which is perpendicular to and extends outward from the second portion away from the first sleeve and the second sleeve, the second portion and the third portion forming a cross configuration, the third portion having upwardly and downwardly raised protruding ridges thereon, wherein the first sleeve, the second sleeve and the resilient member pass through a boundary that separates two spaces from one another, the resilient member being located inside the boundary.

* * * * *